Patented May 20, 1952

2,597,438

UNITED STATES PATENT OFFICE 2,597,438

CATION-EXCHANGE POLYMERS OF THE SULFONIC TYPE

George W. Bodamer, Cheltenham, Pa., assignor to Rohm & Haas Company, Philadelphia, Pa., a corporation of Delaware No Drawing. Application May 12, 1951, Serial No. 226,092

5 Claims. (Cl. 260—79.3)

This invention relates to cation-exchange polymers and to their preparation and use. It relates to insoluble cation-exchange resins of the sulfonic type which are proliferous polymers and which are characterized by unusually large areas of surface, very high degrees of porosity, high adsorption-capacity and very rapid rates of adsorption. More specifically it relates to the preparation and use of polymers which have the chemical properties of sulfonic cation-exchangers and the physical properties of the so-called popcorn or proliferous polymers. As a result of this peculiar combination of chemical and physical properties these ion-exchange resins have distinct advantages in many applications over the denser, harder sulfonic exchangers employed heretofore. They are particularly suitable for use in catalysis, in the demineralization of non-aqueous systems, and in the adsorption of cationic materials of very high molecular weight. They can be used in column operation.

Other cation-exchange resins of the sulfonic type are well known and are marketed in large volumes for the deionization of aqueous fluids in general. Such resins as are being currently used are described for example in U. S. Patents 2,195,196; 2,228,159; 2,228,160 and 2,366,007 and are characterized by being hard, friable, dense, infusible, insoluble, granular or spheroidal particles. They contain in their chemical structure sulfonic acid groups, —$SO_3H$, or sulfonate groups, —$SO_3M$, where M is an equivalent weight of a metal. These groups are attached to the aromatic cyclic nuclei, i. e. benzene rings, either directly or through methylene links, preferably directly. As far as the chemical properties of these known resins and the chemistry of ion-exchange are concerned, the available products are very satisfactory. But the physical properties of these materials—particularly their hard, dense, granular form—limits their utility in many instances such as those mentioned above where their chemical properties would appear to make them ideally suited.

The products of this invention are sulfonated proliferous or popcorn polymers of styrene, and they are most conveniently made by sulfonating a popcorn or proliferous polymer of styrene. Surprisingly, the step of sulfonating the popcorn polystyrene does not destroy or significantly change the physical form of the polymer despite the harsh treatment with sulfonating agents—particularly sulfuric acid—and the chemical change which takes place.

Popcorn polymers of styrene are known. Their formation was first reported by Staudinger and Huseman in their study of the polymers and copolymers of styrene, (Berichte, 68, page 1618 (1935)). They are also described in U. S. Patents 2,205,390; 2,290,164; 2,311,615; 2,331,263 and 2,341,175. While mixtures of popcorn polystyrene and normal, glass-like, thermoplastic polystyrene can be molded, the operation is much more difficult than the molding of the thermoplastic polystyrene alone as indicated in U. S. Patent 2,537,951. Aside from molding, the popcorn polymers of styrene apparently had no other utility heretofore. The popcorn polymers and copolymers of styrene have a spongy, porous structure and are insoluble in the very solvents which dissolve the homogeneous, thermoplastic glass-like polymers which are normally produced. In most cases they do look very much like popcorn. They have very high molecular weights and appear to be cross-linked. In the process of forming popcorn polystyrene the induction period may be long; but soon after a particle of the polymer is formed or is added, the rate of polymerization increases rapidly and the branching, insoluble polymer continues to form until most or all of the monomer is consumed. This is usually referred to as "popping." It is a characteristic of this type of polymerization that the polymer "grows" in much the same way as a salt crystal "grows" when a salt solution is concentrated. If the product is not confined or restrained physically, polymerization proceeds in random directions with the formation of a branched or clustered, expanded or "popped" product. That is, polymerization progresses by proliferation with the rapid and repeated production of new parts; and for this reason the term "proliferous polymer," which has been applied to this kind of polymer and which is now synonymous with "popcorn polymer," is particularly apt—and is truly descriptive.

The products of this invention are cation-adsorbing, sulfonated proliferous polymers of styrene. The exact composition of the resins can vary within reasonable limits depending upon the degree of sulfonation of the proliferous polystyrene or depending upon the materials which are copolymerized with the styrene in order to facilitate popping or to modify some physical property, such as the porosity of the finished product.

In preparing the proliferous polystyrene from which the products of this invention are made, the most satisfactory method comprises holding a mixture of styrene and an auxiliary polyolefinic popping-agent at a temperature from room temperature (20° C.) to about 80° C., in the presence of a seed of a proliferous polymer, while excluding oxygen.

In general, polymerization progresses more rapidly as the temperature is raised but at temperatures above about 80° C. the proliferous polymer is usually mixed with an objectionable amount of the normal glass-like polymer and consequently temperatures from about 50° C. to about 70° C. are preferred and recommended.

A wide variety of polyolefinic compounds definitely assist in the formation of the proliferous polystyrene. These auxiliary materials which function as popping-agents or as catalysts for proliferous polymerization are all polyolefinic compounds in which the olefinic likages are in the acyclic portion of the molecule and are the reactive groups which enter into the proliferous copolymerization reaction. Since this invention is concerned primarily with the manufacture of cation-exchange resins and only indirectly with the many ways in which popcorn polystyrene can be made, it is not intended to be limited or restricted by the particular auxiliary compound or popping-agent which is used to assist in preparing the intermediate popcorn polystyrene. While numerous polyolefinic materials act as popping-agents, examples of some of the best include divinylbenzene, butadiene, isoprene, bimethallyl, biallyl, trivinylbenzene, cyclopentadiene and similar polyolefinic hydrocarbons. Also effective are other unsaturated compounds such as dimethallyl ether and sulfide, vinyl allyl ether and those unsaturated esters, such as diallyl maleate and 2-chlorallyl crotonate, which are disclosed in U. S. Patents 2,311,615 and 2,341,175. The auxiliary compounds give every evidence of copolymerizing with the styrene and consequently are present in the final copolymeric products. This is one reason why the polyolefinic hydrocarbons are preferred. It is evident that as the amount of the auxiliary compound is increased the number of styrene nuclei which can be sulfonated is necessarily reduced. And since the capacity of the final resin for adsorbing cations is proportional to the number of nuclear sulfonate groups in the product, it is desirable to hold the amount of the copolymerizable auxiliary compound to a minimum. On the other hand the use of a polyolefinic compound does exert a beneficial effect on the speed of polymerization and on the character and uniformity of the product. The use of as little as 0.5% of an auxiliary compound is evident in the results which are obtained. The most satisfactory and suggested amounts, however, are from 2% to 30%, based on the total weight of this compound and the styrene. The use of larger amounts has been studied but there does not appear to be any advantage in exceeding 30%— or even 20%—particularly when the ion-adsorbing capacity of the final product is considered. While all of the auxiliary compounds are alike in having a plurality of non-benzenoid, olefinic linkages or double bonds in their chemical structure, and in facilitating the popping of styrene, it is also true that these compounds differ in degree as regards the effect they have on the density and porosity of the final copolymer. For example, a material such as divinylbenzene, which is recognized as a particularly fast and efficient cross-linking agent for styrene and vinyl compounds in general, aids very materially in the popping of styrene, but it also gives rise to harder, less porous, popcorn polymers than do many of the other auxiliary agents such as butadiene or isoprene. Consequently the amount, within the limits set forth above, of the auxiliary copolymerizable compound which is employed is determined by the degree of porosity or extent of surface-area which is desired in the final product.

The use of a seed to promote the proliferous polymerization is desirable but not necessary. The seed can have the same chemical composition as the proliferous polymer which it is desired to make, or it can have a different chemical composition. The most convenient method involves adding a small amount of a previous batch of proliferous polymer to subsequent mixtures of monomeric styrene which are to be popped. Even the small quantities of one batch which may adhere to the walls of the reaction vessel serve to seed subsequent batches. The word "seed" is used herein in the accepted chemical sense and itself indicates that the amount required is small and that the material is insoluble in the reaction mixture. As little as about 0.001%, on a weight basis, is adequate. Of course when the seed and the polymer being prepared have the same chemical composition, the amount of the seeding material which is employed is immaterial.

Styrene can be made to polymerize proliferously in bulk or in solution or while suspended in an immiscible liquid medium. The advantage in carrying out the polymerization by the suspension technique is that the final product is obtained in the form of discrete particles which adsorb ions unusually rapidly and which, although small, posses the advantageous properties of popcorn polymers such as porosity, high surface-area and insolubility.

It appears that free radicals, such as are provided by peroxidic compounds, play a part in the formation of the opaque proliferous polymers, just as they do in the formation of clear, glass-like polymers. In proliferous polymerization, however, the amounts of the peroxidic compounds, such as benzoyl, lauroyl and stearoyl peroxides, tert.-butyl hydroperoxide and the inorganic per-salts, which can be tolerated is relatively very low and should not exceed 0.5% on a weight basis because large amounts of such compounds favor the formation of the clear glass-like polymers at the expense of the opaque, proliferous polymers. In like manner, a steady and continuous source of oxygen is to be avoided. That is to say, oxygen should be eliminated and, although the amount of air which is normally present in a closed reaction vessel is not too objectionable, it can be replaced to good advantage by an inert gas such as nitrogen. Thus it is most desirable to conduct the proliferous polymerization in the substantially complete absence of oxygen.

The proliferous polymers and copolymers of styrene are sulfonated to produce the cation-adsorbing polymers of this invention. The polymers are sulfonated by means of sulfonating agents such as sulfur trioxide, concentrated sulfuric acid, chlorosulfonic acid, fuming sulfuric acid and the like. Since the rate of sulfonation increases as the temperature is raised it is recommended that temperatures from about 80° C. to the refluxing temperature be employed. An excess of the sulfonating agent is recommended.

The sulfonate groups, however few, which are attached to the aryl nuclei of the proliferous polymer will exchange cations. But from practical considerations, it is most desirable that at least half of the aromatic nuclei contain at least one sulfonate group so that the product will have a reasonable capacity for adsorbing cations. Actually the preferred product contains from one to two sulfonate groups per aryl nucleus in the proliferous polymer. This number can be added readily in the way described above.

After sulfonation is complete the product is washed thoroughly with water to remove the unreacted sulfonating agent. The cation-adsorbing polymer is then in the acid or hydrogen form but it can be readily converted into the salt form by treatment with an excess of a soluble salt, the cations of which salt are thereby exchanged for the hydrogen atoms of the polymer. Conversion of the polymer from one form to another, including regeneration, merely requires treatment of the polymer with a solution containing an excess of the cationic material which it is desired to combine with the polymer.

The following examples, in which all parts are by weight, are presented in order that the preparation and properties of the products of this invention may be thoroughly understood and recognized. The examples are not to be taken, however, as limiting this invention since the invention resides broadly in the conversion of proliferous polymers of styrene, which heretofore had very limited utility, into decidedly valuable cation-exchanging proliferous polymers which are characterized by having extremely large surface-areas and by unusually rapid rates of adsorption.

EXAMPLE I

This serves to show how styrene can be conveniently converted into proliferous or popcorn polymers in bulk. In all cases a glass tube was half-filled with the styrene mixture to be popped. A small piece—a seed—of a previously prepared proliferous copolymer of approximately 90% styrene, 4.4% divinylbenzene and 5.6% ethyl styrene was added. The mixtures contained a major portion of styrene and a minor portion of a polyolefinic auxiliary compound, as a popping-agent, which was known to be copolymerizable with the styrene. Nitrogen was bubbled through the mixtures in order to flush oxygen from the tubes and thereafter the tubes were sealed with a foil-lined cap and were placed in a constant-temperature water-bath. The kind and amount of the auxiliary popping-agent which copolymerized proliferously with the styrene are listed below, together with other pertinent data. The percentages are based on the total weight of the copolymerizable mixtures. An induction period as recorded is that length of time during which no visible change takes place in the monomeric mixture and is followed by a period of propagation during which the polymer is formed on the seed by proliferation. Ordinarily the induction period is several times as long as the period of propagation.

*Table I*

| Polyolefinic Auxiliary Compound | Per Cent Benzoyl Peroxide | Temperature | Induction Period |
|---|---|---|---|
| 10% Butadiene | 0 | Room Temp. | About 8-10 Days. |
| Do | 0 | 50° C | About 5-7 Days. |
| Do | 0.1 | 65° C | 1-1½ Days. |
| 10% Isoprene | 0 | Room Temp. | About 10-12 Days. |
| 10% Butadiene and 5% Commercial Divinylbenzene.[1] | 0 | do | About 6-8 Days. |
| 5% Commercial Divinylbenzene. | 0 | do | About 8-10 Days. |
| Do | 0 | 100° C | About 16 hours.[2] |

[1] The commercial divinylbenzene contained approximately 44% divinylbenzene and 56% ethylstyrene.
[2] This product was approximately 50% proliferous polymer and 50% glass-like polymer. The two polymers could be separated however.

EXAMPLE II

A proliferous copolymer of 90% styrene and 10% butadiene was sulfonated as follows: A mixture of 10 parts of the copolymer (the first described in Example I above) and 360 parts of 98% sulfuric acid was stirred and heated at 80-90° C. for one-half hour. The mixture was cooled to room temperature and was filtered. The copolymeric material was washed free of acid with water and dried overnight in an oven at 65° C. The product, on analysis, was found to contain 13.5% sulfur as against a theoretical sulfur-content of 16.4% calculated on the basis of one sulfonic acid group for each styrene nucleus in the copolymer. It was very porous and had a density of 0.67. When it was soaked in water it swelled to 37 times its original volume. It readily exchanged its hydrogen ions for sodium when it was treated with an excess of a 5% aqueous solution of sodium chloride and thereafter was readily convertible to the acid form by treatment with an excess of a 4% aqueous solution of sulfuric acid.

EXAMPLE III

Six parts of a proliferous copolymer of 85% styrene, 10% butadiene and 5% commercial divinylbenzene (containing approximately 44% divinylbenzene and 56% ethylstyrene) was mixed with 150 parts of 98% sulfuric acid. This proliferous copolymer was the fifth described in Example I above. The mixture was stirred and heated at 113°-117° C. for 1.25 hours, after which it was cooled and filtered. The copolymer was washed free of acid by means of water and was dried overnight in an oven at 65° C. This product was somewhat harder than that of Example II but was a characteristic popcorn polymer with high porosity and large surface-area. It imbibed large volumes of water and expanded to at least twenty times its dry volume when soaked in water. The analysis showed that it contained more than one sulfonic acid group per aryl nucleus (Sulfur: Found 16.5%; theoretical amount corresponding to product containing one sulfonic acid group per aryl nucleus is 15.8%). This product exchanged ions very rapidly and had a capacity of 5.5 milliequivalents per gram.

I claim:

1. A process for preparing solid, water-insoluble, cation-exchange resins which comprises proliferously polymerizing styrene at a temperature from about 20° C. to about 80° C. in the substantially complete absence of oxygen and in the presence of a seed of a previously prepared proliferous polymer, then sulfonating the resultant proliferous polymer, and thereafter isolating the resultant cation-exchange resin.

2. A process for preparing solid, water-insoluble, cation-exchange resins which comprises proliferously polymerizing a mixture of (a) styrene and (b) a polyolefinic, organic compound of which the olefinic linkages are in the acyclic portion of the molecule and are the reactive groups which enter into the copolymerization reaction, said mixture containing at least 70% styrene, at a temperature from about 20° C. to about 80° C. in the substantially complete absence of oxygen and in the presence of a seed of a previously prepared proliferous polymer, then sulfonating the resultant proliferous polymer, and thereafter isolating the resultant cation-exchange resin.

3. A process for preparing solid, water-insoluble, cation-exchange resins which comprises proliferously polymerizing a mixture of (a) 70-99.5% styrene and (b) 0.5-30% divinylbenzene at a temperature from about 20° C. to about 80° C. in the substantially complete absence of oxygen and in the presence of a seed of a previously prepared proliferous polymer, then sulfonating the resultant proliferous polymer, and thereafter isolating the resultant cation-exchange resin.

4. A process for preparing solid, water-insoluble, cation-exchange resins which comprises proliferously polymerizing a mixture of (a) 70–99.5% styrene and (b) 0.5–30% butadiene at a temperature from about 20° C. to about 80° C. in the substantially complete absence of oxygen and in the presence of a seed of a previously prepared proliferous polymer, then sulfonating the resultant proliferous polymer, and thereafter isolating the resultant cation-exchange resin.

5. A process for preparing solid, water-insoluble, cation-exchange resins which comprises proliferously polymerizing a mixture of (a) 70–99.5% styrene and (b) 0.5–30% isoprene at a temperature from about 20° C. to about 80° C. in the substantially complete absence of oxygen and in the presence of a seed of a previously prepared proliferous polymer, then sulfonating the resultant proliferous polymer, and thereafter isolating the resultant cation-exchange resin.

GEORGE W. BODAMER.

REFERENCES CITED

The following references are of record in the file of this patent:

UNITED STATES PATENTS

| Number | Name | Date |
|---|---|---|
| 2,311,615 | Zemba | Feb. 16, 1943 |
| 2,366,007 | D'Alelio | Dec. 26, 1944 |
| 2,500,149 | Boyer | Mar. 14, 1950 |
| 2,527,300 | Dudley | Oct. 24, 1950 |
| 2,537,951 | Amos | Jan. 16, 1951 |

OTHER REFERENCES

Kharasch Ind. & Eng. Chem., July 1947, pp. 830–837.

Staundinger Berichte, vol. 68, pp. 1618–1634 (1935).

Kunin Ion Exchange Resins (1950), pg. 61, John Wiley & Sons, Inc. New York.